United States Patent
Kurita

(10) Patent No.: US 7,110,721 B2
(45) Date of Patent: Sep. 19, 2006

(54) APPARATUS, METHOD AND PROGRAM FOR COMMUNICATION TEST, AND RECORDED MEDIUM ON WHICH THAT PROGRAM HAS BEEN RECORDED

(75) Inventor: Hiroyuki Kurita, Saitama (JP)

(73) Assignee: Advantest Corporation, Tokyo (JP)

( * ) Notice: Subject to any disclaimer, the term of this patent is extended or adjusted under 35 U.S.C. 154(b) by 446 days.

(21) Appl. No.: 10/258,179

(22) PCT Filed: Mar. 26, 2001

(86) PCT No.: PCT/JP01/02385

§ 371 (c)(1), (2), (4) Date: Oct. 22, 2002

(87) PCT Pub. No.: WO01/82510

PCT Pub. Date: Nov. 1, 2001

(65) Prior Publication Data

US 2003/0060193 A1   Mar. 27, 2003

(30) Foreign Application Priority Data

Apr. 25, 2000 (JP) .............................. 2000-128978

(51) Int. Cl.
*H04B 17/00* (2006.01)
(52) U.S. Cl. .............. 455/67.11; 455/423; 455/67.13; 455/405; 455/67.14; 455/424; 455/78; 455/226.1
(58) Field of Classification Search ............... 455/423, 455/424, 67.11, 67.14, 405, 78, 226.1, 226.2
See application file for complete search history.

(56) References Cited

U.S. PATENT DOCUMENTS

| | | | | |
|---|---|---|---|---|
| 5,521,904 A | * | 5/1996 | Eriksson et al. | 370/249 |
| 5,819,177 A | * | 10/1998 | Vucetic et al. | 455/425 |
| 5,920,608 A | * | 7/1999 | Minegishi | 379/15.01 |
| 6,122,505 A | * | 9/2000 | Genell et al. | 455/423 |
| 6,158,031 A | * | 12/2000 | Mack et al. | 714/724 |
| 6,160,871 A | * | 12/2000 | DuRee et al. | 379/9 |

(Continued)

FOREIGN PATENT DOCUMENTS

JP     7-250016     9/1995

(Continued)

*Primary Examiner*—Marceau Milord
(74) *Attorney, Agent, or Firm*—Lowe Hauptman & Berner LLP.

(57) ABSTRACT

There is provided a communication test apparatus that can avoid a pause of a communication test for executing a signaling when executing the communication test, and reduce the time for the communication test.

Because the communication test apparatus establishes the signaling on each $EUT_1$, $EUT_2$, and $EUT_3$ in parallel, the time for the signaling is shortened to about ⅓. Also, since the communication test apparatus executes the communication test for $EUT_1$, $EUT_2$, and $EUT_3$ of which the signaling is established, it is not necessary to make a pause of the communication test until $EUT_2$ and the signaling are established after completing the test for $EUT_1$. Also, because the communication test apparatus establishes $EUT_1$, $EUT_2$, $EUT_3$ and the signaling while executing the communication test for $EUT_4$, $EUT_5$ and $EUT_6$, there is no need to make a pause of the communication test until $EUT_1$, $EUT_2$, $EUT_3$ and the signaling are established after completing the test for $EUT_4$, $EUT_5$ and $EUT_6$.

16 Claims, 6 Drawing Sheets

U.S. PATENT DOCUMENTS

| | | | |
|---|---|---|---|
| 6,381,252 B1 * | 4/2002 | Li et al. | 370/483 |
| 6,434,364 B1 * | 8/2002 | O'Riordain | 455/67.11 |
| 6,662,009 B1 * | 12/2003 | Lynn | 455/424 |
| 6,680,913 B1 * | 1/2004 | Malmivirta et al. | 370/249 |
| 6,687,499 B1 * | 2/2004 | Numminen et al. | 455/423 |
| 6,856,802 B1 * | 2/2005 | Kinnunen et al. | 455/425 |

FOREIGN PATENT DOCUMENTS

JP    2000-209165    7/2000

* cited by examiner

APPARATUS, METHOD AND PROGRAM FOR COMMUNICATION TEST, AND RECORDED MEDIUM ON WHICH THAT PROGRAM HAS BEEN RECORDED

TECHNICAL FIELD

The present invention relates to a communication test for executing a test for a plurality of communication devices.

BACKGROUND ART

Conventionally, a test for radio communication using radio communication terminal as EUT (Equipment Under Test) has been performed. The test for radio communication is accomplished for a radio tester by performing radio communication through a communication terminal and an antenna. Or, the test for radio communication is accomplished by way of directly connecting the radio tester to the communication terminal through a coaxial cable and performing communication through the coaxial cable. On all occasions, it is necessary that the radio tester establishes the connection to the communication terminal, and then, controls the communication terminal, that is, executes the signaling. The time taken for this is called signaling time. The signaling time necessary for the radio tester to execute the signaling with one communication terminal is, for example, approximately 2–3 seconds.

Here, in case where there is a plurality of communication terminals, the radio tester executes the signaling with the communication terminal to be tested later after completing a test for a predetermined communication terminal. And, it executes a test for the communication terminal to be tested later after completing the signaling. Thus, the test for the communication terminal is paused during the signaling time.

Accordingly, in case where there is a plurality of communication terminals, the time that the test is paused cannot be negligible with respect to a total test executing time. This has been a practical problem in case of executing a test for a plurality of communication terminals (EUT).

Therefore, the object of the present invention is to provide a communication test apparatus that can avoid a pause of a communication test for performing a signaling when executing the communication test, and thus, shorten the time for the communication test.

DISCLOSURE OF INVENTION

According to the present invention as described in claim 1, a communication test apparatus for executing a test for a plurality of communication devices, includes: a signaling establishing unit for establishing a signaling with respect to the respective communication devices and a communication test executing unit for executing the communication test for the communication devices, the signaling of which is established. The signaling establishing means starts establishing the signaling with respect to one conmunication device before the signaling establishing means completes establishing the signaling with respect to another communication device and while the signaling establishing means continues establishing the signaling with respect to another communication device.

According to the above-mentioned communication test apparatus, since the signaling establishing unit establishes the signaling on the respective communication devices at the same time, the time taken to the signaling is shortened. Also, because a communication test executing unit executes the communication test for the commuication devices, the signaling of which is etablished, a pause of the communication test is not needed until the signaling is established.

The present invention as described in claim 2, is a communication test apparatus according to claim 1, wherein the signaling establishing unit establishes the signaling with respect to the communication devices while the communication test excuting unit executes the communication test.

According to the above-mentioned communication test apparatus, since the signaling establishing unit establishes the signaling while the communication test executing unit executes the communication test, it is not necessary that the communication test executing unit makes a pause of the communication test until the signaling is established.

The present invention as described in claim 3, is a communication test apparatus, wherein the signaling establishing unit and the communication test executing unit perform radio communication with the communication devices.

According to the present invention as described in claim 4, a communication test apparatus according to claim 3, further including an antenna for performing the radio communication with the communication devices, wherein the antenna is electromagnetically shielded.

The present invention as described in claim 5, is a communication test apparatus, wherein the signaling establishing unit and the communication test executing unit perform wire communication with the communication devices.

According to the present invention as described in claim 6, a communication test apparatus, further including a communication unit for test for connecting the communication test executing unit and the communication devices so as to perform the communication therebetween, and a communication unit for signaling for connecting the signal establishing unit and the communication devices so as to perform the wire communication therebetween and separated from the communication unit for test.

The present invention as described in claim 7, is a communication test apparatus, wherein the signaling establishing unit allows the respective communication devices to wait after establishing the signaling with respect to the respective communication devices.

The present invention as described in claim 8, is a communication test apparatus, wherein the signaling establishing unit sets the communication devices to predetermined internal setting conditions corresponding to the test items, and then, allow the communication devices to wait after establishing the signaling with respect to the respective communication devices.

The present invention as described in claim 9, is a communication test apparatus, wherein the communication test apparatus functions as a pseudo-base station, and the signaling establishing unit sets the internal operation conditions of the communication devices to be testable.

According to the present invention as described in claim 10, a communication test apparatus, further including an interference wave applying unit for applying a predetermined interference wave to a signal to be transmitted and received between the communication test executing unit and the communication devices.

The present invention as described in claim 11, is a communication test apparatus, wherein the signaling establishing unit and the communication test executing unit perform CDMA mode, or FDMA-TDMA and TDD mode communication with the communication devices.

The present invention as described in claim, is a communication test apparatus, wherein the apparatus executes a test for the plurality of communication devices constituting a radio communication network.

The present invention as described in claim 13, is a communication test apparatus according to claim 12, wherein the radio communication network is a cell type or piconet type communication network.

According to the present invention, a communication test method for executing a test for a plurality of communication devices, includes: a signaling establishing step for establishing a signaling with respect to the respective communication devices and a communication test executing step for executing the communication test for the communication devices, the signaling of which is established. The signaling establishing step starts establishing the signaling with respect to one communication device before the signaling establishing step completes establishing the signaling with respect to another communication device and while the signaling establishing step continues establishing the signaling with respect to another communication device.

The present invention is a program of instructions for execution by a computer to perform a communication test processing for executing a test for a plurality of communication devices, the communication test processing including: a signaling establishing process for establishing a signaling with respect to the respective communication devices and a communication test executing process for executing the conununication test for the communication devices, the signaling of which is established. The signaling establishing program starts establishing the signaling with respect to one communication device before the signaling establishing program completes establishing the signaling with respect to another communication device and while the signaling establishing program continues establishing the signaling with respect to another communication device.

The present invention is a computer-readable medium having a program of instructions for execution by the computer to perform a communication test processing for executing a test for a plurality of communication devices, the communication test processing including: a signaling establishing process for establishing a signaling with respect to the respective communication devices and a communication test executing process for executing the communication test for the communication devices, the signaling of which is established. The signaling establishing process starts establishing the signaling with respect to one communication device before the signaling establishing process completes establishing the signaling with respect to another communication device and while the signaling establishing process continues establishing the signaling with respect to another communication device.

BEST MODE FOR CARRYING OUT THE INVENTION

Hereinafter, preferred embodiments of the present invention will be described with reference to the drawings.

FIRST EMBODIMENT

Figure 1:
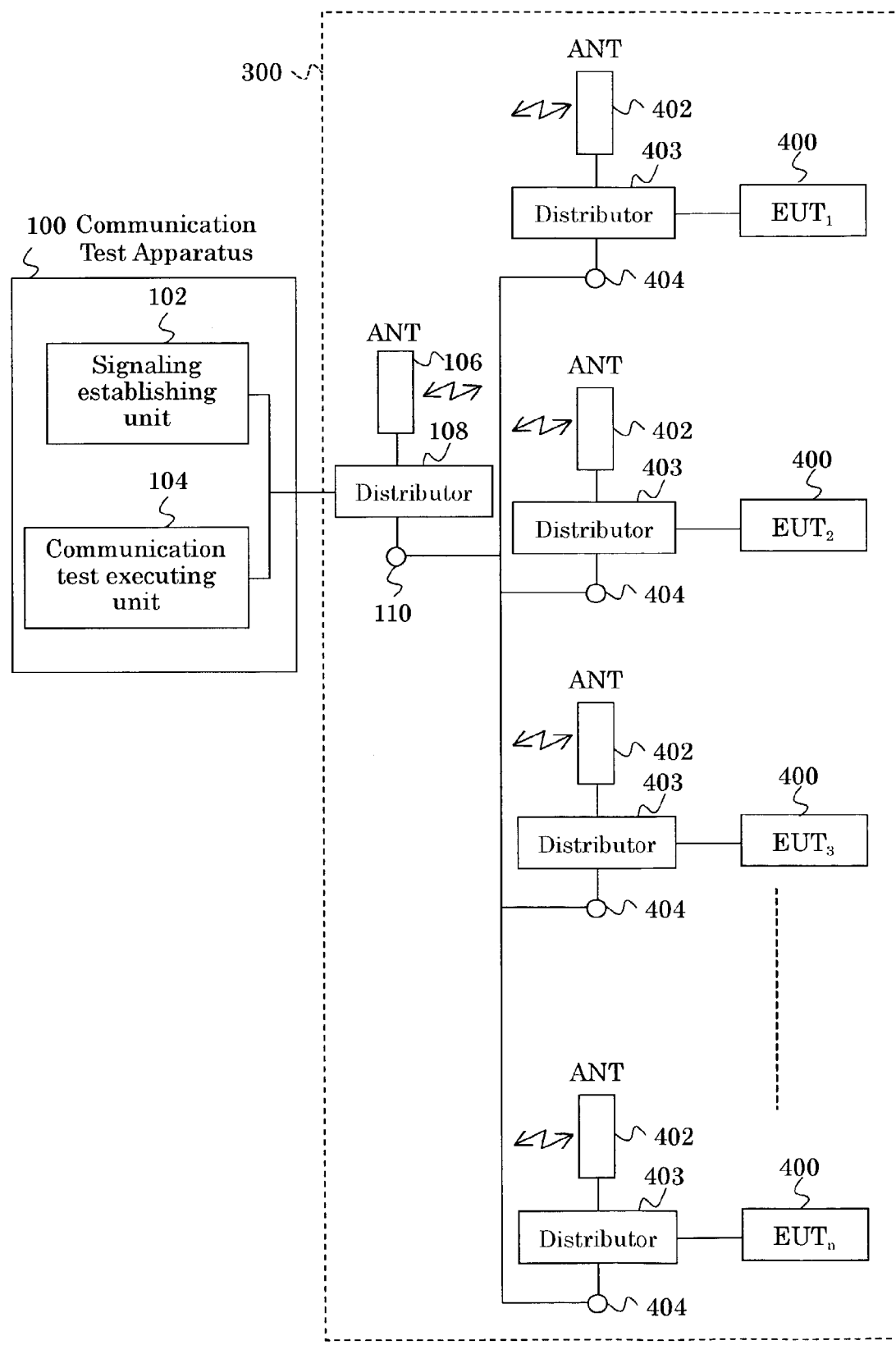
FIG. 1 is a block diagram showing the construction of the communication test system using the communication test apparatus according to the first embodiment of the invention.

FIG. 1 is a block diagram showing a communication test system using a communication test apparatus according to the first embodiment. The communication test apparatus 100 according to the first embodiment has a signaling establishing unit 102, a communication test execution unit 104, an antenna 106, a distributor 108, and a terminal 110.

The communication test apparatus 100 executes test for $EUT_1$, $EUT_2$, $EUT_3$, ... $EUT_n$ 400. This communication device 100 has a function as a pseudo base station in mobile communication. And, EUT 400 is a communication device which is an Equipment Under Test.

The signaling establishing unit 102 establishes the signaling with respect to $EUT_1$, $EUT_2$, $EUT_3$, ... $EUT_n$ 400. The signaling establishing unit 102 sets and controls various internal operational conditions of EUT 400. Thereby, it can control EUT 400 in the status corresponding to the executed test items.

The signaling establishing unit 102 can establish the signaling on a plurality of EUT at the same time, for example, $EUT_1$, $EUT_2$, $EUT_3$ 400. At this time, various internal operational conditions of EUT 400 are also set and controlled. This can be accomplished by executing the signaling of $EUT_1$ using slot 1 of the communication frame, the signaling of $EUT_2$ using slot 2 of the communication frame, and the signaling of $EUT_3$ using slot 3 of the communication frame.

Also, the signaling establishing unit 102 can establish the signaling of EUT that does not execute the communication test while the communication test executing unit 104 executes the communication test. For example, the signaling establishing unit 102 can establish the signaling of $EUT_1$, $EUT_2$, $EUT_3$ 400 while the communication test executing unit 104 executes the communication test for $EUT_4$, $EUT_5$, $EUT_6$ 400. Or, while the communication test executing unit 104 executes the communication test for $EUT_1$ 400, the signaling establishing unit 102 can establish the signaling of $EUT_2$ 400.

The communication test executing unit 104 executes the communication test for $EUT_1$, $EUT_2$, $EUT_3$, ... $EUT_n$ 400 in which the signaling establishing unit 102 establishes the signaling. The test items that the communication test executing unit 104 executes become different according to a communication form (CDMA, FDMA-TDMA & TDD). Meanwhile, the communication test executing unit 104 has different built-in measurement function factors according to the kind of test items with respect to the communication form (communication mode) or EUT 400. Therefore, it is used generally with connecting the individual communication test apparatus 100 corresponding to the test items.

As an example of the test items, there are frequency reliability, occupied bandwidth characteristic, leakage power on near channels, spurious strength, peak power measurement, transmission power control, transmission power frequency drift, receiving sensitivity, waveform quality, burst transmission characteristic, signaling (connection establishment between call and network, or communication status of call), modulation precision measurement, phase error, time alignment, frame/error rate or bit error rate measurement, frequency hopping, channel/monitoring, channel switching test, communication protocol analysis, echo test, sound test, etc.

Furthermore, the communication test executing unit 104 is also testable in case where a plurality of EUT 400 is synchronously operated. As a result, for example, the advantage that an interference test among a plurality of EUT 400 or a communication protocol test among a plurality of EUT 400 can be effectively executed under the conditions close to an operation status, is obtained.

The antenna 106 is to perform the radio communication between the communication test apparatus 100 and $EUT_1$, $EUT_2$, $EUT_3$, ... $EUT_n$ 400. The terminal 110 is to perform the wire communication between the communication test apparatus 100 and $EUT_1$, $EUT_2$, $EUT_3$, ... $EUT_n$ 400. The distributor 108 is to switch whether the communication device 100 and $EUT_1$, $EUT_2$, $EUT_3$, ... $EUT_n$ 400 perform the radio communication using the antenna 106 or the wire communication using the terminal 110. The signaling establishing unit 102 and the communication test executing unit 104 execute transmission and reception of data with $EUT_1$, $EUT_2$, $EUT_3$, ... $EUT_n$ 400 through the distributor 108.

Figure 2:
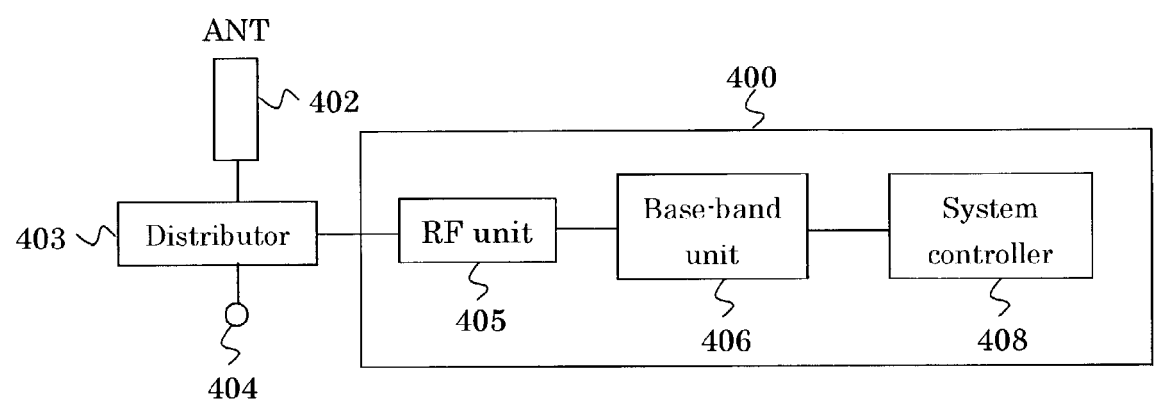
FIG. 2 is a block diagram showing the internal construction of EUT 400.

FIG. 2 shows the internal construction of EUT 400. EUT 400 is a communication device, which is an Equipment Under Test. For example, EUT 400 is a radio communication terminal in CDMA mode or FDMA-TDMA & TDD mode. As a radio communication terminal, for example, there is a digital mode portable telephone of which the specification needs not to be explained because it is described in the standard RCR-STD-27 in details.

EUT 400 has an antenna 402, a distributor 403, a terminal 404, a RF (Radio Frequency) unit 405, a base-band unit 406, and a system controller 408. The antenna 402 is to perform the radio communication between $EUT_1$, $EUT_2$, $EUT_3$, ... $EUT_n$ 400 and the communication test apparatus 100. And, returning to FIG. 1, the antenna 402 and the antenna 106 of the communication test apparatus 100 are disposed within a shield/box 300. And, the shield/box 300 is a shield to intercept unnecessary noise propagation from outside. Here, as shown in FIG. 1, EUT 400 may be installed within the shield/box 300. There may be provided the construction that at least the antenna 402 and the antenna 106 of the communication test apparatus 100 can be disposed within the shield/box 300.

Returning to FIG. 2, the terminal 404 is to perform the wire communication between $EUT_1$, $EUT_2$, $EUT_3$, ... $EUT_n$ 400 and the communication test apparatus 100. Returning to FIG. 1, the terminal 404 is coupled with the terminal 110 of the communication test apparatus 100, for example, by coaxial cable or optical fiber. The distributor 403 is to switch whether $EUT_1$, $EUT_2$, $EUT_3$, ... $EUT_n$ 400 and the communication device 100 perform the radio communication using the antenna 402 or the wire communication using the terminal 404. The RF unit 405 executes transmission and reception of data with $EUT_1$, $EUT_2$, $EUT_3$, ... $EUT_n$ 400 through the distributor 403.

The system controller 408 sets and controls various operational conditions of EUT 400. The base-band unit 406 converts sound signals, etc. into base-band for transmission, and converts the received base-band signals into sound signals, etc. The RF unit 405 converts base-band signals to be transmitted into a predetermined frequency, and outputs as high frequency power having predetermined power level. Also, the RF unit 405 receives signals received from the antenna, etc, and converts the frequencies thereof into base-band.

Figure 3:
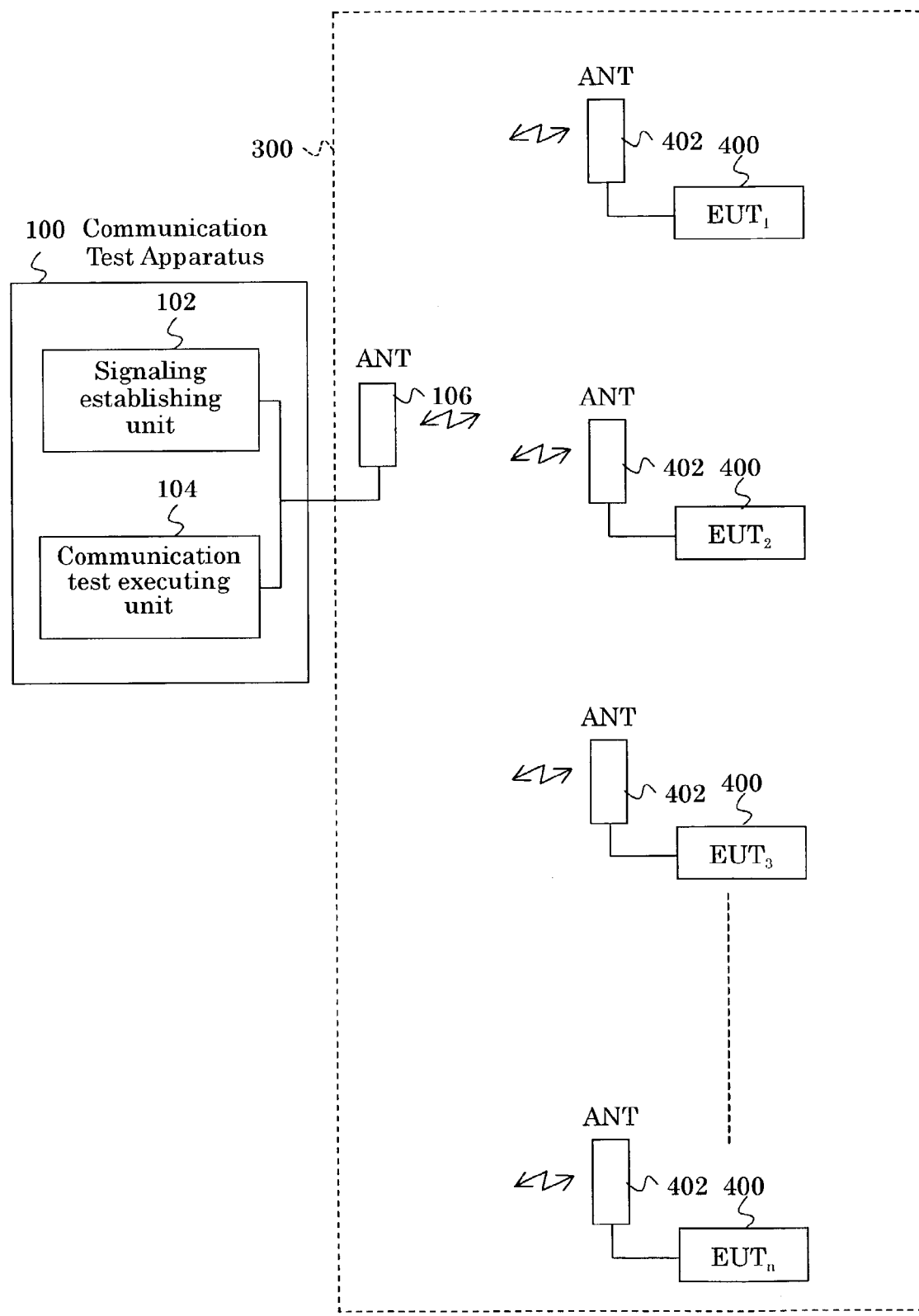
FIG. 3 is a block diagram showing the construction of the communication test system in case of executing the communication test through only a radio communication in a communication test apparatus according to the first embodiment.

And, there is a case that the communication test is executed simply by the radio communication using the antennas 106 and 402. In this case, the distributors 108 and 403 are not needed. FIG. 3 shows the construction of the communication test system using the communication test apparatus 100 for this case. As shown in FIG. 3, the distributors 108 and 403 are not needed, and also, the terminals 110 and 404 are not needed.

Then, in case where the construction of the communication test system as shown in FIG. 3 is taken, EUT 400 needs to be able to set the internal setting conditions as desired through the radio communication. Most of the setting conditions can be controlled from the base station. Or, it can be also controlled by way of controlling the standard control parameters about the call and test mode function that EUT 400 has uniquely. Moreover, common signaling may be sufficient according to the items.

And, for example, the test mode function of the EUT 400 has a function capable of being controlled by remote control from a communication circuit for diagnosing the internal operation of EUT 400. Thereby, the test execution becomes possible by using the test mode function with respect to the test items which cannot be applicable to the standard control parameters about the call. Therefore, by applying these things, the advantage that the external controller for controlling EUT 400 by wire becomes unnecessary can be obtained.

Next, an operation of the first embodiment is explained with reference to the time chart shown in FIG. 4. Also, in FIG. 4, the signaling time, until the setting control corresponding to the test condition is completed from connection starting of the call in three $EUT_1$, $EUT_2$, $EUT_3$, is made constant, and each time is regarded as each signaling time T1, T2, T3. Also, it is assumed that communication frame can use each of the three slots in a full rate channel by each EUT. Also, each time for testing the three $EUT_4$, $EUT_5$, $EUT_6$ is contemplated as T4', T5', T6', respectively. Also, each time for testing $EUT_1$ and $EUT_2$ is contemplated as T1' and T2', respectively.

Figure 4:
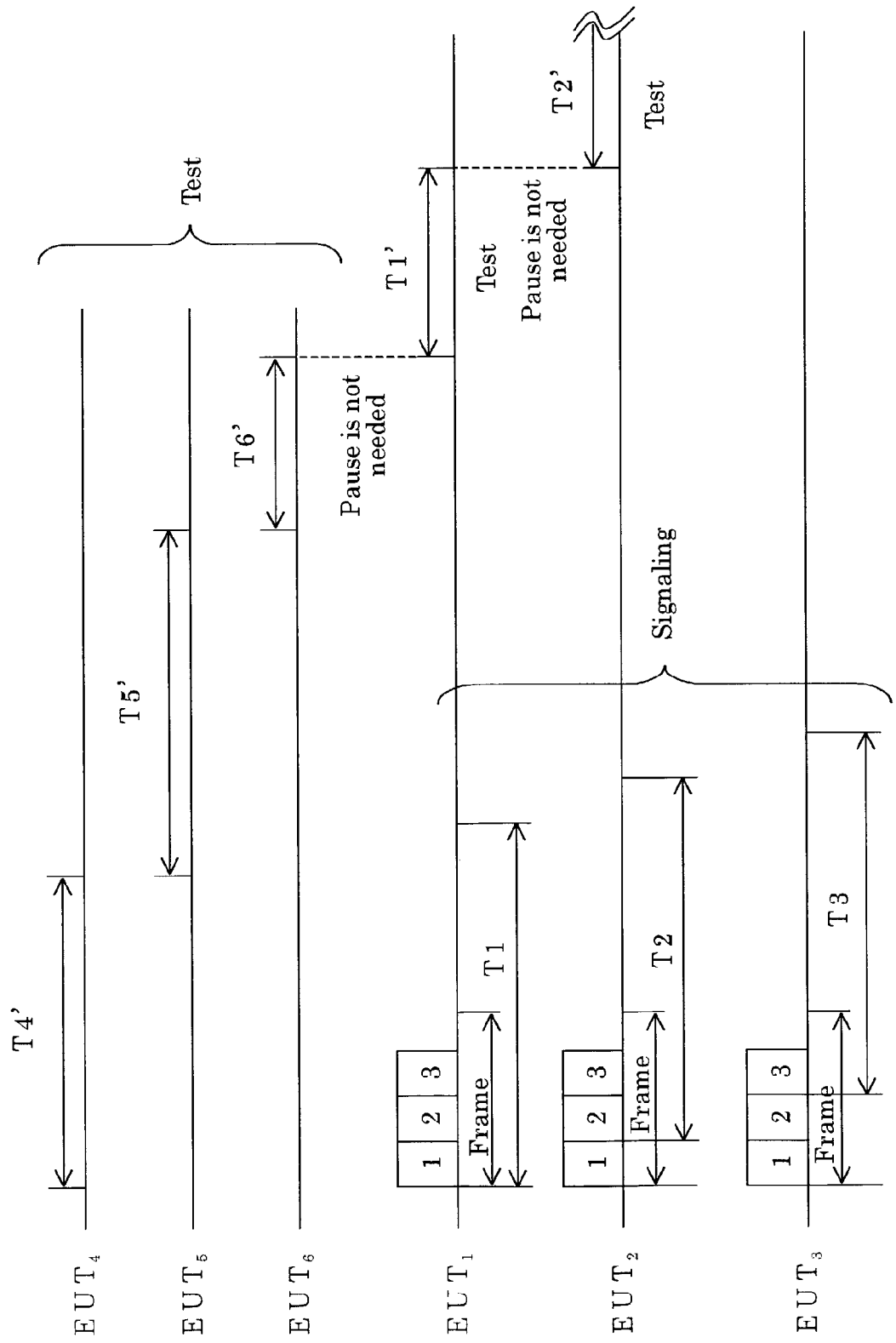
FIG. 4 is a time chart showing an operation of the first embodiment.

With reference to FIG. 4, the communication test executing unit 104 tests $EUT_4$, and it takes as the test time as T4'. After completing the test for $EUT_4$, the communication test executing unit 104 immediately tests $EUT_5$, and it takes as the test time as T5'. After completing the test for $EUT_5$, the communication test executing unit 104 immediately tests $EUT_6$, and it takes as the test time as T6'. After completing the test for $EUT_4$ ($EUT_5$), the reason why the communication test executing unit 104 can immediately enter the test for $EUT_5$ ($EUT_6$) will be explained later.

While the communication test executing unit 104 executes the test for the three $EUT_4$, $EUT_5$, $EUT_6$, the signaling establishing unit 102 establishes the signaling among the three $EUT_1$, $EUT_2$, $EUT_3$, and sets and controls the internal setting conditions as desired. The signaling establishing unit 102 and $EUT_1$ use the slot 1 of the communication frame, and the connection is established after the constant signaling time T1, so that the internal setting conditions of $EUT_1$ are set and controlled as desired and become the setup completion status in which the test can be executed. Also, $EUT_2$ uses the slot 2 of the communication frame, so that the internal setting conditions of $EUT_2$ are set and controlled as desired and become the setup completion status in which the test can be executed. Similarly, $EUT_3$ uses the slot 3 of the communication frame, so that the internal setting conditions of $EUT_3$ are set and controlled as desired and become the setup completion status in which the test can be executed.

Thereby, if T=T1=T2=T3, the signaling establishing unit 102 establishes the signaling among the three $EUT_1$, $EUT_2$, $EUT_3$, and the time for setting and controlling the internal setting conditions as desired is about T. Meanwhile, the time that the signaling establishing unit 102 executes the signaling establishment, etc. with each EUT becomes total 3T. Thus, the time that the signaling establishing unit 102 executes the signaling establishment, etc. with three $EUT_1$, $EUT_2$, $EUT_3$ becomes about ⅓ compared to the case for executing the signaling establishment, etc. with each EUT.

When the communication test executing unit 104 completes the test for three $EUT_4$, $EUT_5$, $EUT_6$, the signaling establishment of three $EUT_1$, $EUT_2$, $EUT_3$ has been already completed. Therefore, when the communication test executing unit 104 starts the test for three $EUT_1$, $EUT_2$, $EUT_3$, a pause of the test is not needed. Also, it is identical to the case where the signaling establishment is executed one by one. For example, while the communication test executing unit 104 executes the test for $EUT_4$, if the signaling establishing unit 102 executes the signaling establishment with $EUT_1$, the communication test executing unit 104 can start without making a pause of the test for $EUT_1$ after completing the test for $EUT_4$.

Here, the communication test executing unit 104 test $EUT_1$, and it takes as the test time as T1'. At this time, since the signaling has been already established in the communication test apparatus 100 and $EUT_2$, the communication test executing unit 104 can execute the test for $EUT_2$ without making a pause of the test. The reason why the communication test executing unit 104 can enter the test for $EUT_5$ ($EUT_6$) immediately after completing the test for $EUT_4$ ($EUT_5$) is the same.

According to the first embodiment, since the signaling establishing unit 102 establishes the signaling of each $EUT_1$, $EUT_2$, $EUT_3$ in parallel, the time for the signaling is shortened to about ⅓. Also, since the communication test executing unit 104 executes the communication test for $EUT_1$, $EUT_2$, $EUT_3$, the signaling of which has been established, a pause of the communication test is not needed until the signaling with $EUT_2$ is established after completing the test for $EUT_1$.

Also, since the signaling establishing unit 102 establishes the signaling with $EUT_1$, $EUT_2$, $EUT_3$ while the communication test executing unit 104 executes the communication test for $EUT_4$, $EUT_5$, $EUT_6$, it is not necessary that the communication test executing unit 104 makes a pause of the communication test until the signaling with $EUT_1$, $EUT_2$, $EUT_3$ is established in the communication test apparatus 100 after completing the communication test for $EUT_4$, $EUT_5$, $EUT_6$.

Particularly, in case where a plurality of EUT is manufactured and all characteristics thereof are tested, there are advantages that the test time can be shortened, and various kinds of test items can be executed under the test conditions close to the operation status.

Also, since a plurality of EUT 400 can be setup under the operation status and the test thereof can be executed, the interference test according to the operation among the plurality of EUT 400 or the practical test regarding the communication protocols among terminals, which could not be tested conventionally, can be performed.

SECOND EMBODIMENT

The communication test apparatus 100 according to the second embodiment is different from the first embodiment in view that it has an interference wave generating unit 500 and an adder 502.

Figure 5:
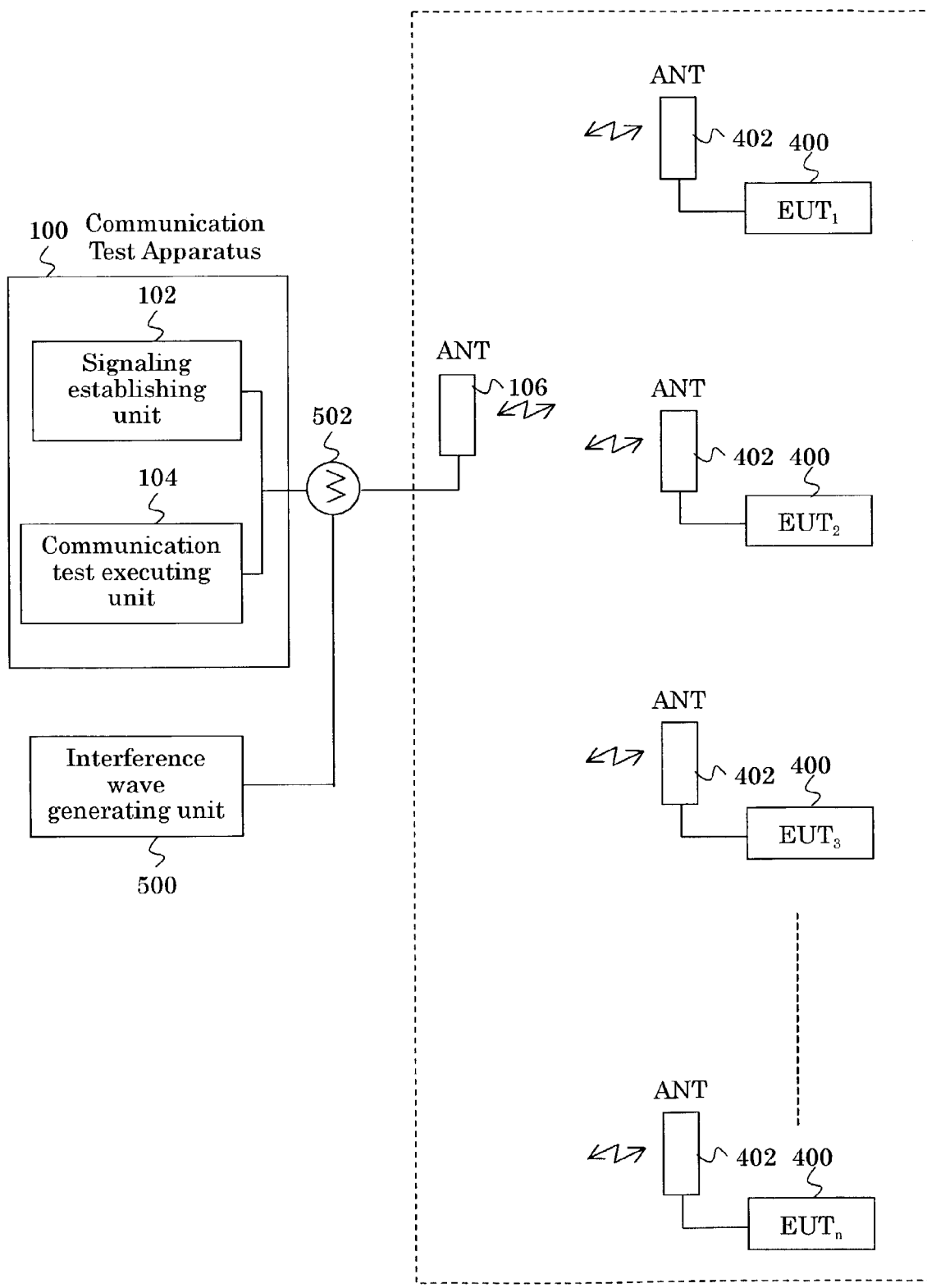
FIG. 5 is a block diagram showing a construction of the communication test system using the communication test apparatus 100 according to the second embodiment.

FIG. 5 is a block diagram showing the construction of the communication test system using the communication test apparatus 100 according to the second embodiment. Hereinafter, the same parts as the first embodiment are attached with the same reference numerals, and the explanation thereof will be omitted. Also, in the second embodiment, the communication test apparatus 100 and EUT 400 is contemplated to perform only radio communication.

The communication test apparatus 100 according to the second embodiment has a signaling establishing unit 102, a communication test executing unit 104, an antenna 106, an interference wave generating unit 500, and an adder 502. The signaling establishing unit 102, the communication test executing unit 104 and the antenna 106 are the same as those of the first embodiment, and the explanation thereof is omitted.

The interference generating unit 500 generates interference wave noise with various conditions. The adder 502 adds the interference wave noise that the interference wave generation unit 500 generates to the communication data transmitted and received between the communication test apparatus 100 and EUT 400.

The internal construction of EUT 400 and operation of the communication test apparatus 100 are the same as those of the first embodiment, and the explanation thereof is omitted.

According to the second embodiment, all characteristics of the receiving system in EUT 400 according to the addition of the interference wave noise can be measured. Also, when the spurious communication disorder is imparted by the interference wave noise, the communication status between the communication test apparatus 100 and the single EUT 400, or the behavior or interference of the communication protocol can be measured. Also, the communication status among a plurality of EUT 400, or the behavior or interference of the communication protocol can be measured. Therefore, it can be tested whether EUT 400 is normally operating or not. As a result, the practical test under the field conditions close to the operation status can be executed.

THIRD EMBODIMENT

The communication test apparatus 100 according to the third embodiment is different from the first embodiment, in that the antennas 106 and 402 (communication means for test) to which the communication test executing unit 104 and EUT 400 are connected to be able to perform the communication, and an Ethernet cable 602 and a controller 604 (communication means for signaling) to which the signaling establishing unit 102 is connected to be able to perform the wire communication with EUT 400 are separated.

Figure 6:
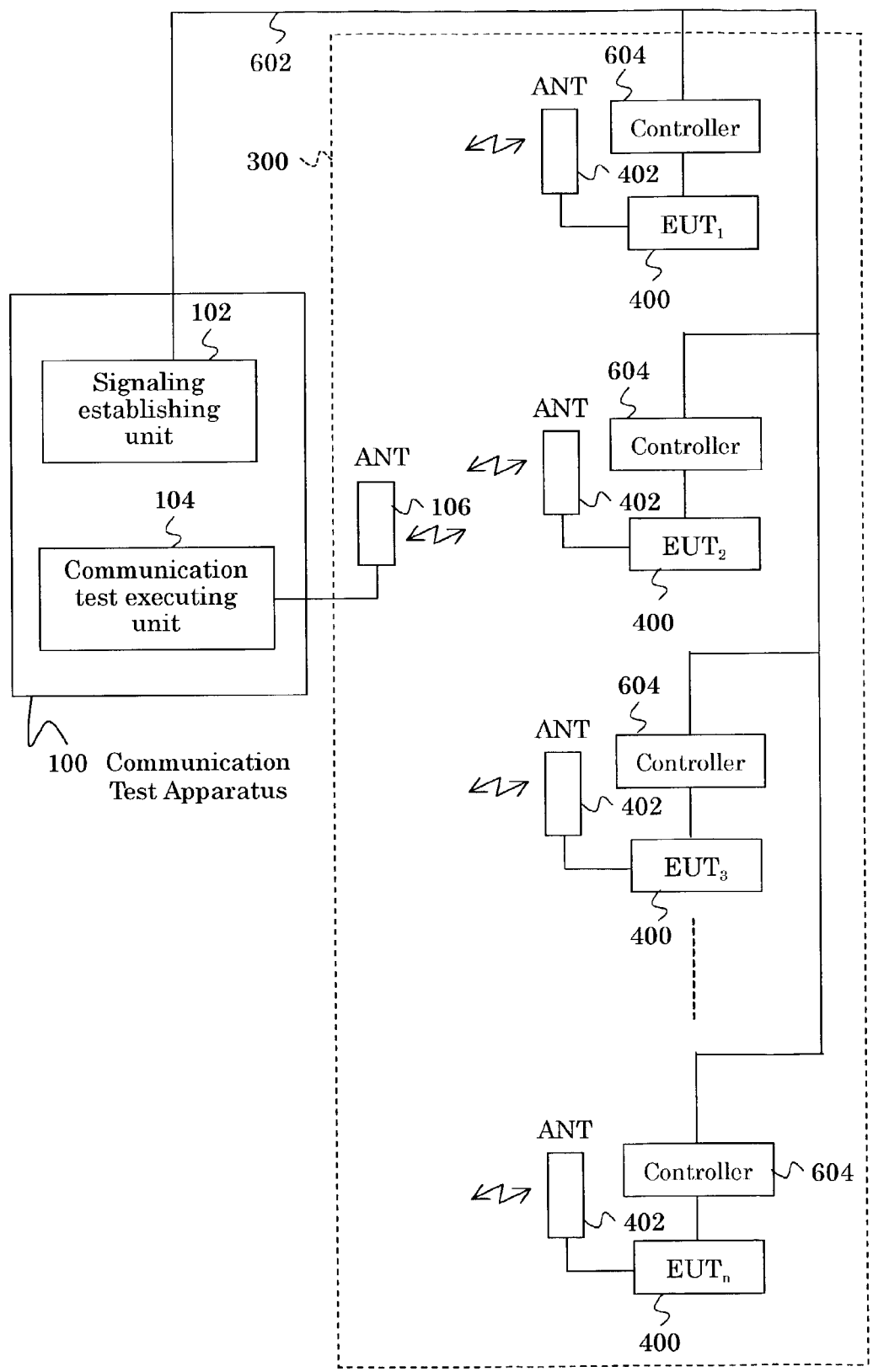
FIG. 6 is a block diagram showing a construction of the communication test system using the communication test apparatus 100 according to the third embodiment.

FIG. 6 is a block diagram showing the construction of the communication test system using the communication test apparatus 100 according to the third embodiment. Hereinafter, the same parts as the first embodiment are attached with the same reference numerals, and the explanation thereof will be omitted. Also, in the third embodiment, the communication test executing unit 104 and EUT 400 perform only the radio communication.

The communication test apparatus 100 according to the third embodiment has the signaling establishing unit 102, the communication test executing unit 104, and the antenna 106. The communication test executing unit 104 is connected to the antenna 106, and performs the communication with EUT 400 through the antenna 106. However, the signaling establishing unit 102 performs the communication with EUT 400 through the Ethernet cable 602 and the controller 604. Except for this, because the rest is the same as the first embodiment, the explanation thereof is omitted.

The Ethernet cable 602 and the controller 604 comprise a communication means for signaling that the signaling establishing unit 102 is connected to be able to perform the wire communication with EUT 400. The Ethernet cable 602 is connected to the signaling establishing unit 102 and the controller 604. The controller 604, for example, as a personal computer, establishes the signaling with the EUT 400, and sets and controls the internal setting conditions of EUT 400 on the basis of the signal transmitted from the signaling establishing unit 102 through the Ethernet cable 602.

The same effects as the first embodiment is also obtained by the third embodiment.

Also, the technical idea of the present invention is not limited to examples of the concrete construction and the connection form of the above-mentioned embodiments. Further, the various changes of the above-mentioned embodiments may be effected within the technical idea of the present invention.

The above-mentioned embodiments explain the communication test apparatus 100 as a pseudo base station. However, in other radio network, radio LAN or for example, Bluetooth for performing the radio communication between a plurality of EUT 400, as mentioned in the above, the practical test can also be executed under the conditions close to the operation status. This is possible because the communication test apparatus 100 has a function as a pseudo master or a pseudo slave of the Bluetooth. For example, it can be executed with respect to the various test items in the maximum 8 piconets. Similarly, it can be executed in a cell-mode communication test.

In addition, the above embodiments may be realized as follows. A media (floppy disk, CD-ROM, etc.) reading device of computer having CPU and hard disk, reads a media recording a program that carries out said respective units (for example, the signaling establishing unit 102 and the communication test executing unit 104) to install on the hard disk. In this way, the above function can be accomplished.

According to the present invention, since the signaling establishing means establishes the signaling with respect to the respective communication devices in parallel, the time for the signaling can be shortened. Also, because the communication test executing means executes the communication test for the communication devices, the signaling of which is established, it is not necessary to make a pause of the communication test until the signaling is established.

The invention claimed is:

1. A communication test apparatus for executing a test for a plurality of communication devices, comprising:
    a signaling establishing means for establishing a signaling with respect to said respective communication devices; and
    a communication test executing means for executing the communication test for said communication devices, the signaling of which is established,
    wherein said signaling establishing means starts establishing the signaling with respect to one communication device before said signaling establishing means completes establishing the signaling with respect to another communication device and while said signaling establishing means continues establishing the signaling with respect to said another communication device.

2. A conmiunication test apparatus according to claim 1, wherein said signaling establishing means establishes the signaling with respect to one communication device while said communication test executing means executes said communication test with respect to at least one other communication device.

3. A communication test apparatus according to claim 1, wherein said signaling establishing means and said communication test executing means perform radio communication with said communication devices.

4. A communication test apparatus according to claim 3, further comprising an antenna for performing the radio communication with said communication devices, wherein said antenna is electromagnetically shielded.

5. A communication test apparatus according to claim 1, wherein said signaling establishing means said communication test executing means perform wire communication with said communication devices.

6. A communication test apparatus according to claim 1 further comprising a communication means for test for connecting said communication test executing means and said communication devices so as to perform the communication therebetween, and
    a communication means for signaling for connecting said signaling establishing means and said communication devices so as to perform the wire communication therebetween and separated from said communication means for test.

7. A communication test apparatus according to claim 1, wherein said signaling establishing means allows said respective communication devices to wait after establishing the signaling with respect to said respective communication devices.

8. A communication test apparatus according to claim 1, wherein said signaling establishing means sets said communication devices to predetermined internal setting conditions corresponding to the test items, and then, allows the communication devices to wait after establishing the signaling with respect to said respective communication devices.

9. A communication test apparatus according to claim 1, wherein said communication test apparatus functions as a pseudo-base station, and said signaling establishing means sets the internal operation conditions of said communication devices to be testable.

10. A communication test apparatus according to claim 1, further comprising an interference wave applying means for applying a predetermined interference wave to a signal transmitted and received between said communication test executing means and said communication devices.

11. A communication test apparatus according to claim 1, wherein said signaling establishing means and said communication test executing means perform CDMA mode, or FDMA-TDMA and TDD mode communication with said communication devices.

12. A communication test apparatus according to claim 1, wherein the apparatus executes a test for said plurality of communication devices constituting a radio communication network.

13. A communication test apparatus according to claim 12, wherein said radio communication network is a cell type or piconet type communication network.

14. A communication test method for executing a test for a plurality of communication devices, comprising:
- a signaling establishing step for establishing a signaling with respect to said respective communication devices; and
- a communication test executing step for executing the communication test for said communication devices, the signaling of which is established.
- wherein said signaling establishing step starts establishing the signaling with respect to one communication device before said signaling establishing step completes establishing the signaling with respect to another communication device and while said signaling establishing step continues establishing the signaling with respect to said another communication device.

15. A program of instructions for execution by a computer to perform a communication test processing for executing a test for a plurality of communication devices, said communication test processing comprising:
- a signaling establishing process for establishing a signaling with respect to said respective communication devices; and
- a communication test executing process for executing the communication test for said communication devices, the signaling of which is established,
- wherein said signaling establishing process starts establishing the signaling with respect to one communication device before said signaling establishing process completes establishing the signaling with respect to another communication device and while said signaling establishing process continues establishing the signaling with respect to said another communication device.

16. A computer-readable medium having a program of instructions for execution by the computer to perform a communication test processing for executing a test for a plurality of communication devices, said communication test processing comprising:
- a signaling establishing process for establishing a signaling with respect to said respective communication devices, and
- a communication test executing process for executing the communication test for said communication devices, the signaling of which is established.
- wherein said signaling establishing process starts establishing the signaling with respect to one communication device before said signaling establishing process completes establishing the signaling with respect to another communication device and while said signaling establishing process continues establishing the signaling with respect to said another communication device.

* * * * *